(12) United States Patent
Srinivasan

(10) Patent No.: US 11,143,081 B2
(45) Date of Patent: Oct. 12, 2021

(54) REDUCTANT DEPOSIT DETECTION USING A RADIOFREQUENCY SENSOR

(71) Applicant: Cummins Emission Solutions Inc., Columbus, IN (US)

(72) Inventor: Sriram Srinivasan, Greenwood, IN (US)

(73) Assignee: Cummins Emission Solutions Inc., Columbus, IN (US)

( * ) Notice: Subject to any disclaimer, the term of this patent is extended or adjusted under 35 U.S.C. 154(b) by 0 days.

(21) Appl. No.: 16/621,584

(22) PCT Filed: Jun. 25, 2018

(86) PCT No.: PCT/US2018/039276
§ 371 (c)(1),
(2) Date: Dec. 11, 2019

(87) PCT Pub. No.: WO2019/005668
PCT Pub. Date: Jan. 3, 2019

(65) Prior Publication Data
US 2020/0157997 A1    May 21, 2020

Related U.S. Application Data

(60) Provisional application No. 62/525,415, filed on Jun. 27, 2017.

(51) Int. Cl.
*F01N 9/00* (2006.01)
*G08C 17/02* (2006.01)

(52) U.S. Cl.
CPC ............. *F01N 9/002* (2013.01); *G08C 17/02* (2013.01)

(58) Field of Classification Search
CPC ..... F01N 3/10; F01N 3/20; F01N 9/00; F01N 9/002; G08B 17/11; G08B 17/117
See application file for complete search history.

(56) References Cited

U.S. PATENT DOCUMENTS

| 6,888,040 | B1* | 5/2005 | Shufflebotham | B01D 53/70 |
| | | | | 423/240 R |
| 2005/0274104 | A1 | 12/2005 | Bromberg et al. | |
| 2011/0030343 | A1 | 2/2011 | Kiser et al. | |
| 2014/0245719 | A1 | 9/2014 | Mitchell et al. | |
| 2015/0358091 | A1 | 12/2015 | Sappok et al. | |
| 2017/0107877 | A1 | 4/2017 | Johnson et al. | |

OTHER PUBLICATIONS

International Search Report & Written Opinion for PCT/US2018/039276 dated Oct. 25, 2018, 9 pages.
First Office Action issued in Indian Patent Application No. 201947047998, dated Mar. 5, 2020, 7 pages.

* cited by examiner

*Primary Examiner* — John Kwon
*Assistant Examiner* — Johnny H Hoang
(74) *Attorney, Agent, or Firm* — Foley & Lardner LLP

(57) ABSTRACT

A process for detecting reductant deposits includes accessing data indicative of signal output from a radiofrequency sensor positioned proximate a decomposition reactor tube; comparing the data indicative of signal output from the radiofrequency sensor to a deposit formation threshold; and activating a deposit mitigation process responsive to the data indicative of signal output from the radiofrequency sensor exceeding the deposit formation threshold.

16 Claims, 4 Drawing Sheets

REDUCTANT DEPOSIT DETECTION USING A RADIOFREQUENCY SENSOR

CROSS-REFERENCE TO RELATED PATENT APPLICATION

The present application is the U.S. national stage of PCT Application No. PCT/US2018/039276, filed Jun. 25, 2018, which claims the benefit of, and priority to, U.S. Provisional Patent Application No. 62/525,415, filed Jun. 27, 2017, the contents of which are incorporated herein by reference in their entireties.

TECHNICAL FIELD

The present application relates generally to the field of aftertreatment systems for internal combustion engines.

BACKGROUND

For internal combustion engines, such as diesel engines, nitrogen oxide ($NO_x$) compounds may be emitted in the exhaust. To reduce $NO_x$ emissions, a selective catalytic reduction (SCR) process may be implemented to convert the $NO_x$ compounds into more neutral compounds, such as diatomic nitrogen, water, or carbon dioxide, with the aid of a catalyst and a reductant. The catalyst may be included in a catalyst chamber of an exhaust system, such as that of a vehicle or power generation unit. A reductant, such as anhydrous ammonia, aqueous ammonia, or urea, is typically introduced into the exhaust gas flow prior to the catalyst chamber. To introduce the reductant into the exhaust gas flow for the selective catalytic reduction process, a selective catalytic reduction system may dose or otherwise introduce the reductant through a dosing module that vaporizes or sprays the reductant into an exhaust pipe of the exhaust system up-stream of the catalyst chamber. The selective catalytic reduction system may include one or more sensors to monitor conditions within the exhaust system.

SUMMARY

Implementations described herein relate to reductant deposit detection using a radiofrequency sensor.

One embodiment relates to a process for detecting reductant deposits. The process includes accessing data indicative of signal output from a radiofrequency sensor positioned proximate a decomposition reactor tube; comparing the data indicative of signal output from the radiofrequency sensor to a deposit formation threshold; and activating a deposit mitigation process responsive to the data indicative of signal output from the radiofrequency sensor exceeding the deposit formation threshold.

Another embodiment relates to an aftertreatment system. The aftertreatment system includes a decomposition reactor tube, a doser, a first radiofrequency device, and a second radiofrequency device. The doser is coupled to the decomposition reactor tube and configured to dose exhaust gas within the decomposition reactor tube with reductant. The first radiofrequency device is coupled to the decomposition reactor tube. The first radiofrequency device includes a first radiofrequency communicator configured to receive a radiofrequency signal from within the decomposition reactor tube. The second radiofrequency device is coupled to the decomposition reactor tube. The second radiofrequency device includes a second radiofrequency communicator configured to transmit the radiofrequency signal from within the decomposition reactor tube.

BRIEF DESCRIPTION

The details of one or more implementations are set forth in the accompanying drawings and the description below. Other features, aspects, and advantages of the disclosure will become apparent from the description, the drawings, and the claims, in which:

It will be recognized that some or all of the figures are schematic representations for purposes of illustration. The figures are provided for the purpose of illustrating one or more implementations with the explicit understanding that they will not be used to limit the scope or the meaning of the claims.

DETAILED DESCRIPTION

Following below are more detailed descriptions of various concepts related to, and implementations of, methods, apparatuses, and systems for reductant deposit detection using radiofrequency sensors. The various concepts introduced above and discussed in greater detail below may be implemented in any of numerous ways, as the described concepts are not limited to any particular manner of implementation. Examples of specific implementations and applications are provided primarily for illustrative purposes.

I. Overview

With increasing endeavors to reduce emissions, the desired total tailpipe $NO_x$ (i.e., the amount of $NO_x$ emitted from the exit of the exhaust system) for a vehicle has dropped exponentially since selective catalytic reduction systems were first introduced.

While reducing the $NO_x$ produced by an engine is one way of addressing the reduction of total tailpipe $NO_x$, that approach may result in a reduced fuel economy. With some engine systems moving in the direction of high engine-out $NO_x$, reducing tailpipe $NO_x$ may be shifted to the exhaust gas treatment system (EGTS). At the high levels of reductant dosing to maintain the selective catalytic reduction $NO_x$ conversion efficiency targets, occasionally reductant may form deposits on a decomposition reactor tube (DRT), which can result in one or more failure modes. The presence of reductant deposits can reduce the selective catalytic reduction $NO_x$ conversion capability since the $NH_3$ is not being stored on the catalyst to help with $NO_x$ reduction, but is instead forming deposits/puddles at the front face of the selective catalytic reduction catalyst. Reductant deposits can also increase the backpressure on the engine, forcing it to operate less efficiently.

Some current methods of detecting a reductant deposit rely on either an increase in the backpressure or a decrease in the selective catalytic reduction $NO_x$ conversion efficiency as measured from an selective catalytic reduction inlet $NO_x$ sensor and selective catalytic reduction outlet $NO_x$ sensor. Both methods detect the presence of reductant deposits, but are reactive in nature. That is, each of the foregoing methods detects the reductant deposits after they have formed. Additionally, neither method determines a quantity of reductant deposits. Furthermore, the use of $NO_x$ sensors can result in additional failure modes, such as cross-sensitivity to $NH_3$ resulting in a false-positive when an increased $NH_3$ slip from the selective catalytic reduction is misconstrued as reduced $NO_x$ conversion capability.

II. Overview of Aftertreatment System

Figure 1:
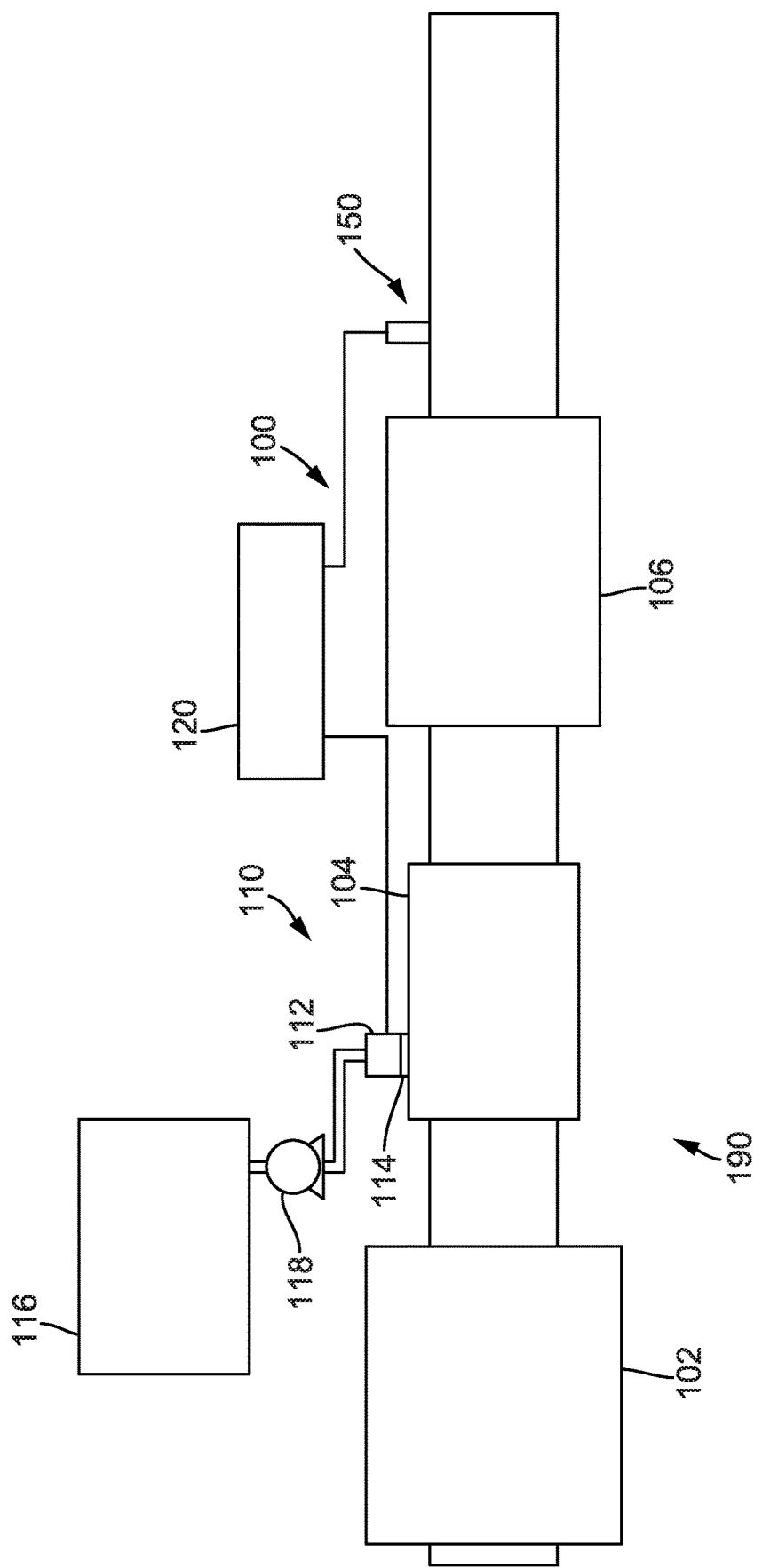
FIG. 1 is a block schematic diagram of an example selective catalytic reduction system having an example reductant delivery system for an exhaust system.

FIG. 1 depicts an aftertreatment system 100 having an example reductant delivery system 110 for an exhaust system 190. The aftertreatment system 100 includes a particulate filter, for example a diesel particulate filter (DPF) 102, the reductant delivery system 110, a decomposition chamber or reactor tube 104, a selective catalytic reduction catalyst 106, and a sensor 150.

The diesel particulate filter 102 is configured to remove particulate matter, such as soot, from exhaust gas flowing in the exhaust system 190. The diesel particulate filter 102 includes an inlet, where the exhaust gas is received, and an outlet, where the exhaust gas exits after having particulate matter substantially filtered from the exhaust gas and/or converting the particulate matter into carbon dioxide.

The decomposition chamber 104 is configured to convert a reductant, such as urea, aqueous ammonia, or diesel exhaust fluid (DEF), into ammonia. The decomposition chamber 104 includes a reductant delivery system 110 having a dosing module 112 configured to dose the reductant into the decomposition chamber 104. In some implementations, the reductant is injected upstream of the selective catalytic reduction catalyst 106. The reductant droplets then undergo the processes of evaporation, thermolysis, and hydrolysis to form gaseous ammonia within the exhaust system 190. The decomposition chamber 104 includes an inlet in fluid communication with the diesel particulate filter 102 to receive the exhaust gas containing $NO_x$ emissions and an outlet for the exhaust gas, $NO_x$ emissions, ammonia, and/or remaining reductant to flow to the selective catalytic reduction catalyst 106.

The decomposition chamber 104 includes the dosing module 112 mounted to the decomposition chamber 104 such that the dosing module 112 may dose the reductant into the exhaust gases flowing in the exhaust system 190. The dosing module 112 may include an insulator 114 interposed between a portion of the dosing module 112 and the portion of the decomposition chamber 104 to which the dosing module 112 is mounted. The dosing module 112 is fluidly coupled to one or more reductant sources 116. In some implementations, a pump 118 may be used to pressurize the reductant from the reductant source 116 for delivery to the dosing module 112.

The dosing module 112 and pump 118 are also electrically or communicatively coupled to a controller 120. The controller 120 is configured to control the dosing module 112 to dose reductant into the decomposition chamber 104. The controller 120 may also be configured to control the pump 118. The controller 120 may include a microprocessor, an application-specific integrated circuit (ASIC), a field-programmable gate array (FPGA), etc., or combinations thereof. The controller 120 may include memory which may include, but is not limited to, electronic, optical, magnetic, or any other storage or transmission device capable of providing a processor, application-specific integrated circuit, field-programmable gate array, etc. with program instructions. The memory may include a memory chip, electrically erasable programmable read-only memory (EEPROM), erasable programmable read only memory (EPROM), flash memory, or any other suitable memory from which the controller 120 can read instructions. The instructions may include code from any suitable programming language.

The selective catalytic reduction catalyst 106 is configured to assist in the reduction of $NO_x$ emissions by accelerating a $NO_x$ reduction process between the ammonia and the $NO_x$ of the exhaust gas into diatomic nitrogen, water, and/or carbon dioxide. The selective catalytic reduction catalyst 106 includes inlet in fluid communication with the decomposition chamber 104 from which exhaust gas and reductant is received and an outlet in fluid communication with an end of the exhaust system 190.

The exhaust system 190 may further include an oxidation catalyst, for example a diesel oxidation catalyst (DOC), in fluid communication with the exhaust system 190 (e.g., downstream of the selective catalytic reduction catalyst 106 or upstream of the diesel particulate filter 102) to oxidize hydrocarbons and carbon monoxide in the exhaust gas.

In some implementations, the diesel particulate filter 102 may be positioned downstream of the decomposition chamber or reactor tube 104. For instance, the diesel particulate filter 102 and the selective catalytic reduction catalyst 106 may be combined into a single unit, such as a diesel particulate filter with selective catalytic reduction-coating (SDPF). In some implementations, the dosing module 112 may instead be positioned downstream of a turbocharger or upstream of a turbocharger.

The sensor 150 may be coupled to the exhaust system 190 to detect a condition of the exhaust gas flowing through the exhaust system 190. In some implementations, the sensor 150 may have a portion disposed within the exhaust system 190, such as a tip of the sensor 150 may extend into a portion of the exhaust system 190. In other implementations, the sensor 150 may receive exhaust gas through another conduit, such as a sample pipe extending from the exhaust system 190. While the sensor 150 is depicted as positioned downstream of the selective catalytic reduction catalyst 106, it should be understood that the sensor 150 may be positioned at any other position of the exhaust system 190, including upstream of the diesel particulate filter 102, within the diesel particulate filter 102, between the diesel particulate filter 102 and the decomposition chamber 104, within the decomposition chamber 104, between the decomposition chamber 104 and the selective catalytic reduction catalyst 106, within the selective catalytic reduction catalyst 106, or downstream of the selective catalytic reduction catalyst 106. In addition, two or more sensors 150 may be utilized for detecting a condition of the exhaust gas, such as two, three, four, five, or six sensors 150 with each sensor 150 located at one of the foregoing positions of the exhaust system 190.

III. Example Deposit Detection Using a Radiofrequency Sensor

In some implementations, radiofrequency (RF) sensing technology can be used to detect the presence of reductant or $NH_3$ deposits in the decomposition reactor tube (DRT) 104. In some implementations, the radiofrequency sensor may be a radiometer. The radiometer may have an operational range between 0.4 GHz and 2.5 GHz. In addition, the radiofrequency sensor can be used to determine the amount of NH$_3$ storage on the selective catalytic reduction catalyst 106 based on calibrations of the radiofrequency sensor output. As the selective catalytic reduction catalyst 106 acts as a resonant cavity, the radiofrequency sensor can detect a base level radiofrequency measurement for a selective catalytic reduction catalyst 106 with no NH$_3$ storage. The base level radiofrequency measurement can be measured and stored in a machine readable medium. In some implementations, the base level radiofrequency measurement for the selective catalytic reduction catalyst 106 may be initially stored when the aftertreatment system is first constructed. In other implementations, the base level radiofrequency measurement for the selective catalytic reduction catalyst 106 may be stored upon each key-on event for a vehicle. In still further implementations, the base level radiofrequency measurement for the selective catalytic reduction catalyst 106 may be stored when the selective catalytic reduction catalyst 106 has no NH$_3$ storage for a predetermined period of time (e.g., for one minute), such that the base level radiofrequency measurement can be reset each time the stored NH$_3$ on the selective catalytic reduction catalyst 106 is known to be exhausted. To detect the amount of NH$_3$ storage on the selective catalytic reduction catalyst 106, a measured radiofrequency signal can be compared to the stored base radiofrequency level measurement to compare the variations in signal peaks at resonant modes. That is, when NH$_3$ is stored on the selective catalytic reduction catalyst 106, the dielectric properties of the cavity of the selective catalytic reduction catalyst 106 changes and affects the signal peaks at resonant modes. A comparison of the change in measured signal peak at resonant modes can be compared to a stored table of known NH$_3$ storage amounts and/or a NH$_3$ storage transfer function can be empirically determined based on the stored base radiofrequency level measurement and used to calculate an amount of NH$_3$ storage on the selective catalytic reduction catalyst 106. In some implementations, the foregoing radiofrequency sensor measurement to detect NH$_3$ storage can be used to detect other contaminants on other aftertreatment components, such as the diesel particulate filter 102, diesel oxidation catalyst, etc. In still other implementations, the radiofrequency sensor may be used to detect contamination deposits in other cavities of a vehicle.

In addition to detecting the NH$_3$ storage on a catalyst, the radiofrequency sensors can be used to detect reductant deposits within the decomposition reactor tube 104. As the decomposition reactor tube 104 acts as a resonant cavity, similar to the selective catalytic reduction catalyst, the radiofrequency sensor can detect a base level radiofrequency measurement for a decomposition reactor tube 104 with no reductant deposits. The base level radiofrequency measurement can be measured and stored in a machine readable medium. In some implementations, the base level radiofrequency measurement for the decomposition reactor tube 104 may be initially stored when the aftertreatment system is first constructed. In other implementations, the base level radiofrequency measurement for the decomposition reactor tube 104 may be stored upon each key-on event for a vehicle. In still further implementations, the base level radiofrequency measurement for the decomposition reactor tube 104 may be stored after a regeneration event to clear reductant deposits in the decomposition reactor tube 104. To detect the amount of reductant deposits in the decomposition reactor tube 104, a measured radiofrequency signal can be compared to the stored base radiofrequency level measurement to compare the variations in signal peaks at resonant modes. That is, when reductant deposits form in the decomposition reactor tube 104, the dielectric properties of the cavity of the decomposition reactor tube 104 changes and affects the signal peaks at resonant modes. A comparison of the change in measured signal peak at resonant modes can be compared to a stored table of known reductant deposit amounts and/or a reductant deposit transfer function can be empirically determined based on the stored base radiofrequency level measurement and used to calculate an amount of reductant deposits in the decomposition reactor tube 104.

If the amount of NH$_3$ storage and/or reductant deposit is known, then control strategies can be implemented to modulate the engine-out NO$_x$, exhaust gas temperature, exhaust gas mass-flow, and/or reductant dosing to control the amount of NH$_3$ storage and/or reduce the amount of reductant deposit and/or eliminate it entirely.

Figure 2:
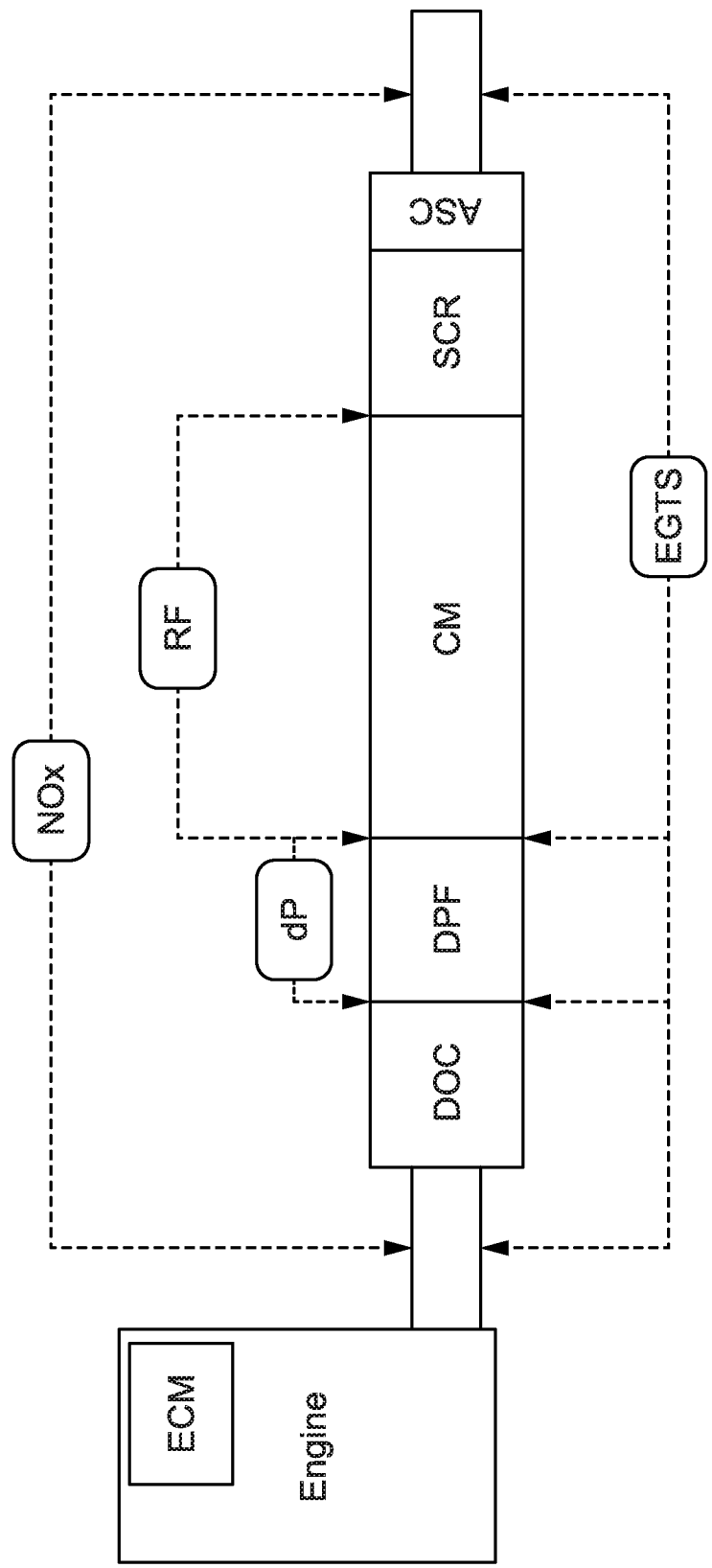
FIG. 2 is a block schematic depicting an exhaust system with radiofrequency sensors deployed proximate the decomposition reactor tube to detect reductant deposits.

In the implementation shown in FIG. 2, radiofrequency sensor probes can be placed at an upstream position and/or a downstream position of a decomposition reactor tube and/or selective catalytic reduction catalyst. The position of the radiofrequency sensor probes define the boundaries of the Faraday cage/shield formed by the aftertreatment system components. Accordingly, the base level radiofrequency measurement is taken for a particular location of the radiofrequency sensor probe for calibration purposes and any changes to the radiofrequency sensor probe location will need recalibration. The exhaust tube housing acts as a Faraday shield and helps exclude electrostatic and electromagnetic interference from other components of the exhaust system and/or vehicle. The radiofrequency signal is affected in a repeatable way in the presence of reductant deposits (amplitude, phase shift, etc.) and these calibrated radiofrequency signal responses are used to detect the presence and/or quantity of NH$_3$ storage and/or reductant deposits using an NH$_3$ storage and/or reductant deposit transfer function.

In some implementations, two radiofrequency sensor probes can be used to calculate a reflected parameter, $S_{11}$, and a transmission parameter, $S_{12}$, based on radiofrequency scattering, which can be used to detect NH$_3$ storage and/or reductant deposit amounts. In some implementations, radiofrequency noise, such as from temperature variations within the aftertreatment system, can be compensated based on measuring the temperature with a temperature sensor.

Based on the radiofrequency signal response, the engine-out NO$_x$, engine temperature and/or exhaust mass flow can be modified to gradually decompose the reductant deposits. In some implementations, the radiofrequency signal response can be integrated into a reductant dosing strategy to improve robustness and reduce the likelihood of failure modes due to reductant deposits.

Figure 3:
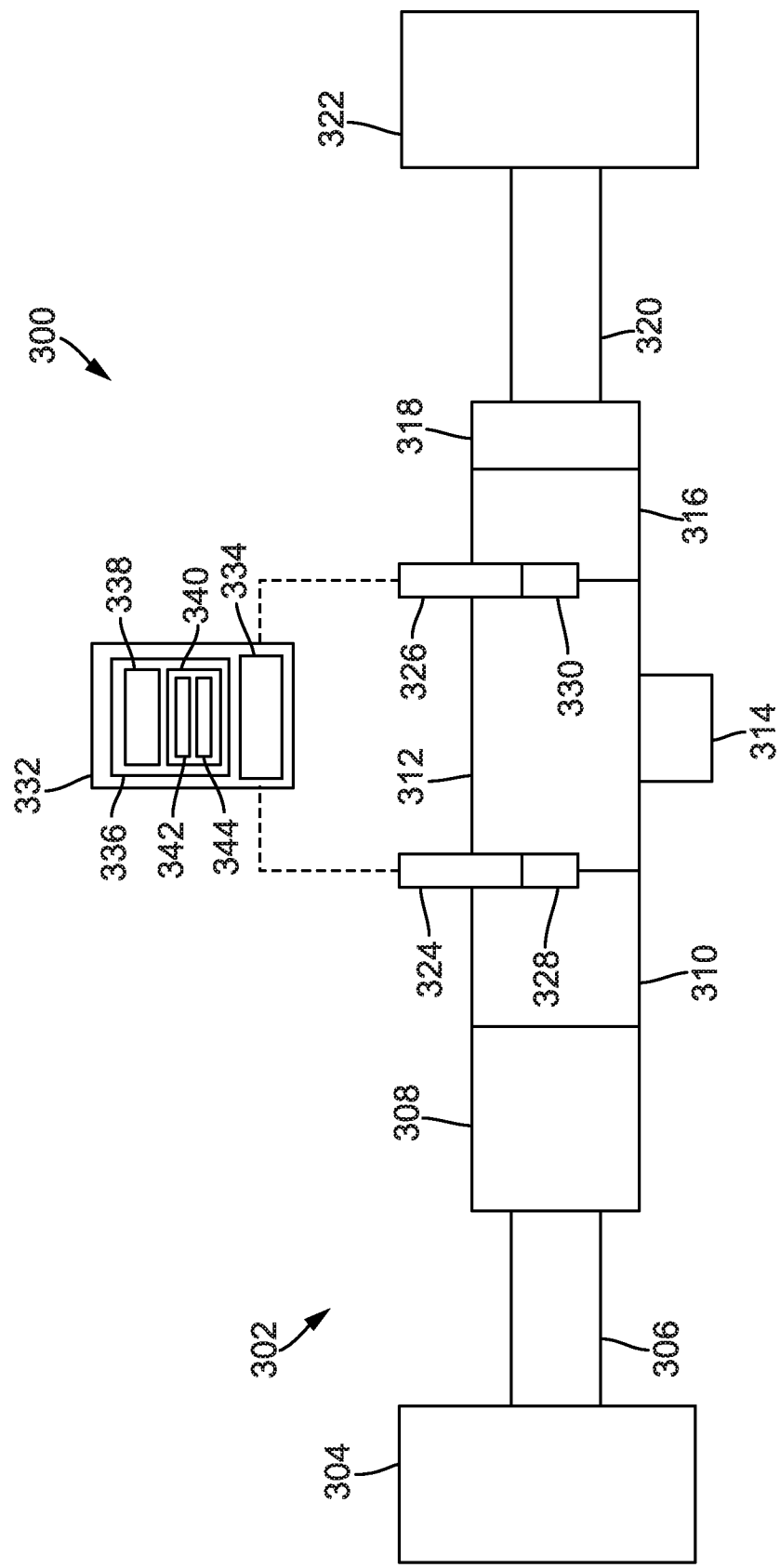
FIG. 3 is a block schematic depicting a reductant deposit mitigation system.

FIG. 3 illustrates a reductant deposit mitigation system 300, according to an example embodiment. The reductant deposit mitigation system 300 is implemented in an aftertreatment system 302. The aftertreatment system 302 includes an upstream exhaust component 304. The upstream exhaust component 304 receives exhaust gases from an internal combustion engine (e.g., a diesel internal combustion engine, etc.). In various embodiments, the upstream exhaust component 304 is a manifold of the internal combustion engine. In other embodiments, the upstream exhaust component 304 is a turbocharger of the internal combustion engine. In still other embodiments, the upstream exhaust component 304 is a component of a waste heat recovery system.

The aftertreatment system 302 also includes an upstream exhaust conduit 306 (e.g., exhaust pipe, etc.). The upstream exhaust conduit 306 receives the exhaust gases from the upstream exhaust component 304. The aftertreatment system 302 also includes a diesel oxidation catalyst 308. The diesel oxidation catalyst 308 oxidizes hydrocarbons and carbon monoxide in the exhaust gases received from the upstream exhaust component 304. As a result, the diesel oxidation catalyst 308 may provide a mixture of carbon dioxide and water, among other components.

The aftertreatment system 302 also includes a diesel particulate filter 310. The diesel particulate filter 310 receives the exhaust gases from the diesel oxidation catalyst 308. In various embodiments, the diesel oxidation catalyst 308 is positioned immediately upstream of the diesel particulate filter 310 such that the diesel oxidation catalyst 308 and the diesel particulate filter 310 are contained in some same housing and are not separated by an exhaust conduit. In other embodiments, the diesel oxidation catalyst 308 and the diesel particulate filter 310 are separated by an exhaust conduit similar to the upstream exhaust conduit 306. The diesel particulate filter 310 removes particulate matter, such as soot, from the exhaust gases provided by the diesel oxidation catalyst 308. The diesel particulate filter 310 includes an inlet, where the exhaust gases are received, and an outlet, where the exhaust gases exit after having particulate matter substantially filtered from the exhaust gases and/or converted into carbon dioxide.

The aftertreatment system 302 also includes a decomposition reactor tube 312. The decomposition reactor tube 312 receives the exhaust gases from the diesel particulate filter 310. In various embodiments, the diesel particulate filter 310 is positioned immediately upstream of the decomposition reactor tube 312 such that the diesel particulate filter 310 and the decomposition reactor tube 312 are contained in some same housing and are not separated by an exhaust conduit. In other embodiments, the diesel particulate filter 310 and the decomposition reactor tube 312 are separated by an exhaust conduit similar to the upstream exhaust conduit 306. The decomposition reactor tube 312 converts reductant provided by a doser 314 into ammonia, $NH_3$, through hydrolysis. In various embodiments, the doser 314 is coupled to the decomposition reactor tube 312 such that the reductant is provided directly into the decomposition reactor tube 312. In other embodiments, the doser 314 is coupled to the aftertreatment system 302 upstream of the decomposition reactor tube 312. For example, the doser 314 may be coupled to the diesel particulate filter 310 or the diesel oxidation catalyst 308. In various embodiments, the decomposition reactor tube 312 may include various mixers (e.g., baffles, vanes, etc.) and other flow devices configured to facilitate mixing of the exhaust gases and reductant. For example, the decomposition reactor tube 312 may include a mixing device configured to impart a swirl flow. The decomposition reactor tube 312 includes an inlet, where the exhaust gases are received, and an outlet, where the exhaust gases exit (e.g., after being mixed with reductant, etc.).

The aftertreatment system 302 also includes a selective catalytic reduction catalyst 316. The selective catalytic reduction catalyst 316 receives the exhaust gases (e.g., a mixture of the exhaust gases and reductant, etc.) from the decomposition reactor tube 312. In various embodiments, the decomposition reactor tube 312 is positioned immediately upstream of the selective catalytic reduction catalyst 316 such that the decomposition reactor tube 312 and the selective catalytic reduction catalyst 316 are contained in some same housing and are not separated by an exhaust conduit. In other embodiments, the decomposition reactor tube 312 and the selective catalytic reduction catalyst 316 are separated by an exhaust conduit similar to the upstream exhaust conduit 306. The selective catalytic reduction catalyst 316 converts $NO_x$ into nitrogen gas and water vapor. The selective catalytic reduction catalyst 316 may include various catalysts such as, for example, ceramic catalysts, titanium oxide catalysts, vanadium catalysts, molybdenum catalysts, tungsten catalysts, zeolite catalysts, activated carbon catalysts, and other similar catalysts. The selective catalytic reduction catalyst 316 includes an inlet, where the exhaust gases are received, and an outlet, where the exhaust gases exit.

The aftertreatment system 302 also includes an ammonia slip catalyst (ASC) 318. The ammonia slip catalyst 318 receives the exhaust gases from the selective catalytic reduction catalyst 316. In various embodiments, the selective catalytic reduction catalyst 316 is positioned immediately upstream of the ammonia slip catalyst 318 such that the selective catalytic reduction catalyst 316 and the ammonia slip catalyst 318 are contained in some same housing and are not separated by an exhaust conduit. In other embodiments, the selective catalytic reduction catalyst 316 and the ammonia slip catalyst 318 are separated by an exhaust conduit similar to the upstream exhaust conduit 306. The ammonia slip catalyst 318 mitigates emission of $NH_3$ and/or converts $NO_x$ to nitrogen gas. The ammonia slip catalyst 318 includes an inlet, where the exhaust gases are received, and an outlet, where the exhaust gases exit.

The aftertreatment system 302 also includes a downstream exhaust conduit 320 (e.g., exhaust pipe, etc.). The downstream exhaust conduit 320 receives the exhaust gases from the ammonia slip catalyst 318. The aftertreatment system 302 includes a downstream exhaust component 322. The downstream exhaust component 322 receives exhaust gases from the downstream exhaust conduit 320. In various embodiments, the downstream exhaust component 322 is a tailpipe (e.g., muffler, etc.).

The reductant deposit mitigation system 300 includes a first radiofrequency device 324 and a second radiofrequency device 326. The first radiofrequency device 324 is positioned between the diesel particulate filter 310 and the decomposition reactor tube 312. The second radiofrequency device 326 is positioned between the decomposition reactor tube 312 and the selective catalytic reduction catalyst 316. The first radiofrequency device 324 includes a first radiofrequency communicator 328 positioned within the diesel particulate filter 310 and/or the decomposition reactor tube 312. The second radiofrequency device 326 includes a second radiofrequency communicator 330 positioned within the decomposition reactor tube 312 and/or the selective catalytic reduction catalyst 316. The decomposition reactor tube 312, as well as the diesel particulate filter 310 and/or the selective catalytic reduction catalyst 316 in some embodiments, creates a Faraday cage around the first radiofrequency communicator 328 and the second radiofrequency communicator 330. The Faraday cage facilitates calibration of the first radiofrequency communicator 328 and the second radiofrequency communicator 330 because outside radiofrequency signals are substantially blocked from entering the Faraday cage. Additionally, the Faraday cage substantially excludes electrostatic and electromagnetic interference from other components of the exhaust system and/or vehicle.

The first radiofrequency communicator 328 is a radiofrequency transmitter, a radiofrequency receiver, or a radiofrequency transceiver. The second radiofrequency communicator 330 is a radiofrequency transmitter, a radiofrequency receiver, or a radiofrequency transceiver. In various embodiments, the first radiofrequency communicator 328 is one of a radiofrequency transmitter and a radiofrequency receiver and the second radiofrequency communicator 330 is the other of the radiofrequency transmitter and the radiofrequency receiver. For example, in some embodiments, the first radiofrequency communicator 328 is a radiofrequency transmitter and the second radiofrequency communicator 330 is a radiofrequency receiver. In other embodiments, the first radiofrequency communicator 328 is a radiofrequency receiver and the second radiofrequency communicator 330 is a radiofrequency transmitter. In still other embodiments, both the first radiofrequency communicator 328 and the second radiofrequency communicator 330 are radiofrequency transceivers. A radiofrequency transceiver includes a radiofrequency transmitter and a radiofrequency receiver.

At least one of the first radiofrequency communicator 328 and the second radiofrequency communicator 330 is configured to transmit a radiofrequency signal to the other of the first radiofrequency communicator 328 and the second radiofrequency communicator 330. The radiofrequency signal is affected in a repeatable way in the presence of reductant deposits (amplitude, phase shift, etc.). In embodiments where the first radiofrequency communicator 328 and the second radiofrequency communicator 330 are each radiofrequency transceivers, a first radiofrequency signal may be transmitted from the first radiofrequency communicator 328 to the second radiofrequency communicator 330 and a second radiofrequency signal may be transmitted from the second radiofrequency communicator 330 to the first radiofrequency communicator 328 (e.g., simultaneously, in alternating fashion, etc.).

The reductant deposit mitigation system 300 includes a controller 332, such as a reductant deposit mitigation controller. The controller 332 is electronically communicable with the first radiofrequency device 324, and therefore with the first radiofrequency communicator 328, and the second radiofrequency device 326, and therefore with the second radiofrequency communicator 330. The controller 332 is configured to control the first radiofrequency communicator 328 and/or the second radiofrequency communicator 330 to transmit a radiofrequency signal.

The controller 332 includes an input/output (I/O) interface 334 and a processing circuit 336. The input/output interface 334 facilitates interaction between the processing circuit 336 and the first radiofrequency device 324 and the second radiofrequency device 326. The processing circuit 336 includes a processor 338 and a memory 340. The memory 340 may include, but is not limited to, electronic, optical, magnetic, or any other storage or transmission device capable of providing the processor 338 with program instructions. The memory 340 may include a memory chip, electrically erasable programmable read-only memory, erasable programmable read only memory, flash memory, or any other suitable memory from which the modules can read instructions. The instructions may include code from any suitable programming language.

The memory 340 includes a number of modules (e.g., microprocessors, application-specific integrated circuit, field-programmable gate arrays, etc.). As shown in FIG. 3, the memory 340 includes a first radiofrequency device module 342 and a second radiofrequency device module 344. The first radiofrequency device module 342 is configured to control interactions between the controller 332 and the first radiofrequency device 324. The second radiofrequency device module 344 is configured to control interactions between the controller 332 and the second radiofrequency device 326. The memory 340 may also include additional modules, such as a module for facilitating communication between the controller 332 and an engine control unit (ECU) of an internal combustion engine associated with the reductant deposit mitigation system 300.

The controller 332 is configured to compare a transmitted radiofrequency signal, such as a radiofrequency signal transmitted by the first radiofrequency communicator 328, with a received radiofrequency signal, such as an radiofrequency signal received by the second radiofrequency communicator 330. This comparison is used by the controller 332 to detect the presence and/or quantity of $NH_3$ storage and/or reductant deposits within the decomposition reactor tube 312 using an $NH_3$ storage and/or reductant deposit transfer function.

The controller 332 may analyze a received radiofrequency signal to calculate a reflected parameter, $S_{11}$, and a transmission parameter, $S_{12}$, based on radiofrequency scattering, which can be used to detect $NH_3$ storage and/or reductant deposit amounts. In some implementations, radiofrequency noise, such as from temperature variations within the aftertreatment system, can be compensated by the controller 332 based on measuring the temperature with a temperature sensor.

Based on the comparison, the controller 332 can send a signal to an ECU of the internal combustion engine to modify the engine-out $NO_x$, engine temperature, and/or exhaust mass flow to gradually decompose the reductant deposits. In some implementations, the comparison can be integrated into a reductant dosing strategy implemented by the ECU to improve robustness and reduce the likelihood of failure modes due to reductant deposits.

Rather than merely detecting the presence of the controller 332 utilizes the comparison to determine an exact quantity of reductant deposits within the decomposition reactor tube 312. Other detection systems are not able to determine the amount of reductant deposits and rely on cross-sensitive sensors which can be inaccurate in the presence of $NH_3$ slip.

While the aftertreatment system 302 is shown as including the diesel oxidation catalyst 308, the diesel particulate filter 310, the selective catalytic reduction catalyst 316, and the ammonia slip catalyst 318, it is understood that the aftertreatment system 302 may not include any of the diesel oxidation catalyst 308, the diesel particulate filter 310, the selective catalytic reduction catalyst 316, or the ammonia slip catalyst 318 such that the aftertreatment system 302 is tailored for a target application. Furthermore, the position of any of the diesel oxidation catalyst 308, the diesel particulate filter 310, the selective catalytic reduction catalyst 316, and the ammonia slip catalyst 318 may be varied such that the aftertreatment system 302 is tailored for a target application.

Figure 4:
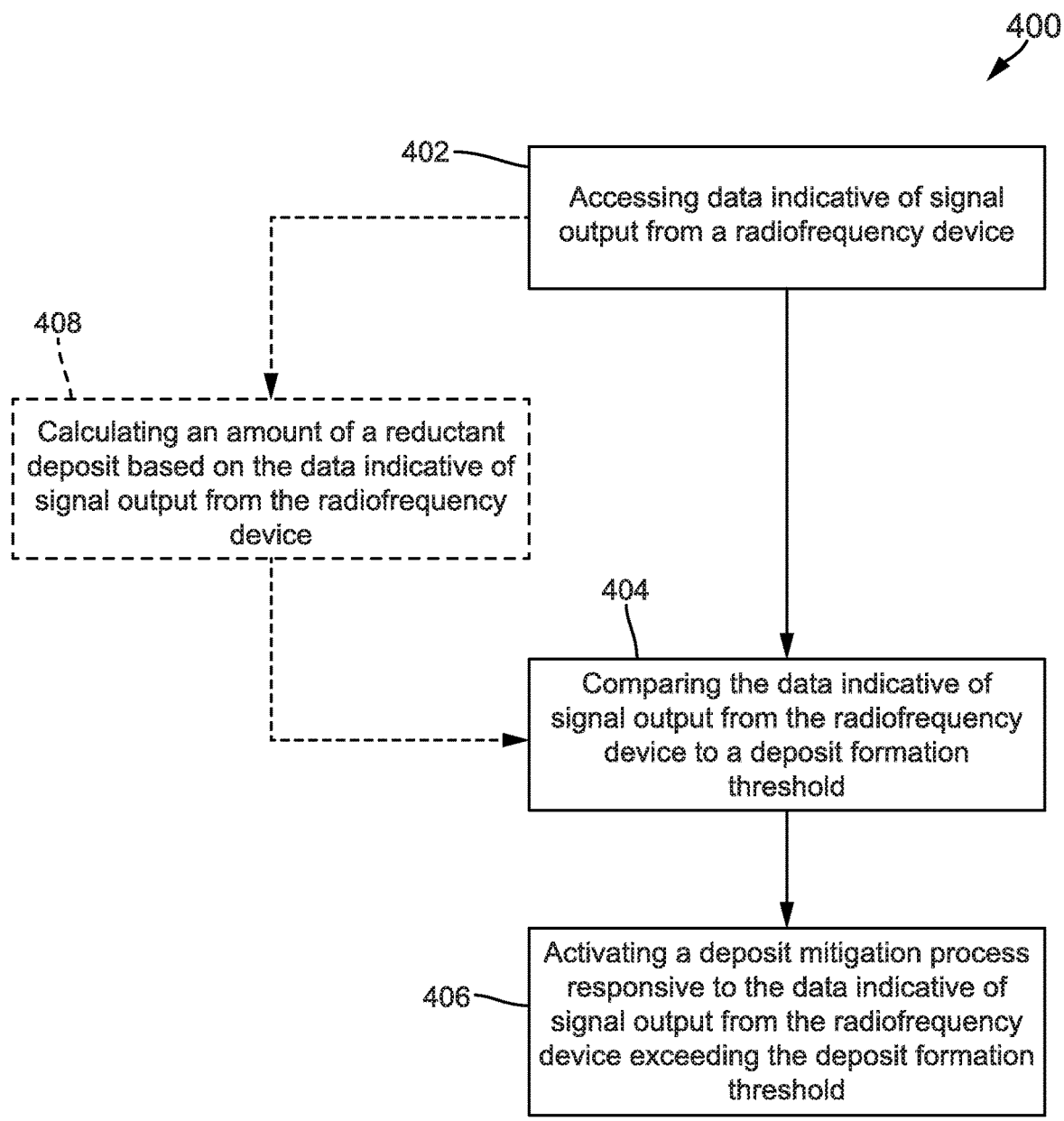
FIG. 4 is a block diagram of a process for mitigating reductant deposits.

FIG. 4 illustrates a process 400 for mitigating reductant deposits using the reductant deposit mitigation system 300 in the aftertreatment system 302. The process 400 begins, in block 402, with accessing, by the controller 332, data indicative of a signal output from a radiofrequency device (e.g., a radiofrequency sensor, the first radiofrequency device 324, the second radiofrequency device 326, etc.). The radiofrequency device is positioned proximate a decomposition reactor tube, such as the decomposition reactor tube 312. Then, in block 404, the controller 332 compares the data indicative of a signal output from the radiofrequency device to a deposit formation threshold. The deposit formation threshold may be programmed into the controller 332 or may be determined by the controller 332 (e.g., by machine learning, etc.). The deposit formation threshold may be associated with an amount of reductant deposits within the decomposition reactor tube 312 which is associated with undesirable performance of the aftertreatment system 302.

The process 400 continues, in block 406, with activating, by the controller 332, a deposit mitigation process in response to the data indicative of a signal output from the radiofrequency device exceeding the deposit formation threshold. For example, if the controller 332 determines that 0.5 mm of reductant deposit is present on the wall of the decomposition reactor tube 312 and the deposit formation threshold is 0.45 mm, the controller 332 may activate a deposit mitigation process. The deposit mitigation process may be, for example, transmitting a signal to the ECU to modify the engine-out $NO_x$, engine temperature, and/or exhaust mass flow to gradually decompose the reductant deposits within the decomposition reactor tube 312.

In some embodiments, the process 400 includes, in block 408 which occurs after block 402 and before block 404, with calculating, by the controller 332, an amount of a reductant deposit (e.g., in the decomposition reactor tube 312, etc.) based on the data indicative of a signal output from the radiofrequency device. In these embodiments, block 404 is implemented by comparing the amount of the reductant deposit to a deposit formation threshold and block 406 is implemented based on that comparison.

IV. Configuration of Exemplary Embodiments

The term "controller" encompasses all kinds of apparatus, devices, and machines for processing data, including by way of example a programmable processor, a computer, a system on a chip, or multiple ones, a portion of a programmed processor, or combinations of the foregoing. The apparatus can include special purpose logic circuitry, e.g., a field-programmable gate array or an application-specific integrated circuit. The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as distributed computing and grid computing infrastructures.

A computer program (also known as a program, software, software application, script, or code) can be written in any form of programming language, including compiled or interpreted languages, declarative or procedural languages, and it can be deployed in any form, including as a standalone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code).

While this specification contains many specific implementation details, these should not be construed as limitations on the scope of what may be claimed, but rather as descriptions of features specific to particular implementations. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, the separation of various system components in the implementations described above should not be understood as requiring such separation in all implementations, and it should be understood that the described components and systems can generally be integrated in a single product or packaged into multiple products embodied on tangible media.

As utilized herein, the terms "approximately," "about," "substantially", and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to the precise numerical ranges provided. Accordingly, these terms should be interpreted as indicating that insubstantial or inconsequential modifications or alterations of the subject matter described and claimed are considered to be within the scope of the invention as recited in the appended claims. Additionally, it is noted that limitations in the claims should not be interpreted as constituting "means plus function" limitations under the United States patent laws in the event that the term "means" is not used therein.

The terms "coupled," "connected," and the like as used herein mean the joining of two components directly or indirectly to one another. Such joining may be stationary (e.g., permanent) or moveable (e.g., removable or releasable). Such joining may be achieved with the two components or the two components and any additional intermediate components being integrally formed as a single unitary body with one another or with the two components or the two components and any additional intermediate components being attached to one another.

The terms "fluidly coupled," "in fluid communication," and the like as used herein mean the two components or objects have a pathway formed between the two components or objects in which a fluid, such as water, air, gaseous reductant, gaseous ammonia, etc., may flow, either with or without intervening components or objects. Examples of fluid couplings or configurations for enabling fluid communication may include piping, channels, or any other suitable components for enabling the flow of a fluid from one component or object to another.

It is important to note that the construction and arrangement of the system shown in the various exemplary implementations is illustrative only and not restrictive in character. All changes and modifications that come within the spirit and/or scope of the described implementations are desired to be protected. It should be understood that some features may not be necessary and implementations lacking the various features may be contemplated as within the scope of the application, the scope being defined by the claims that follow. In reading the claims, it is intended that when words such as "a," "an," "at least one," or "at least one portion" are used there is no intention to limit the claim to only one item unless specifically stated to the contrary in the claim. When the language "at least a portion" and/or "a portion" is used the item can include a portion and/or the entire item unless specifically stated to the contrary.

What is claimed is:

1. An aftertreatment system comprising:
   a decomposition reactor tube;
   a doser coupled to the decomposition reactor tube and configured to dose reductant into exhaust gas within the decomposition reactor tube;
   a first radiofrequency device coupled to the decomposition reactor tube, the first radiofrequency device comprising a first radiofrequency communicator configured to transmit a radiofrequency signal from within the decomposition reactor tube;
   a second radiofrequency device coupled to the decomposition reactor tube, the second radiofrequency device comprising a second radiofrequency communicator configured to receive the radiofrequency signal from within the decomposition reactor tube; and
   a controller configured to determine an amount of reductant deposits within the decomposition reactor tube based on the radiofrequency signal received by the second radiofrequency communicator.

2. The aftertreatment system of claim 1, wherein at least one of the first radiofrequency device or the second radiofrequency device is positioned within a conductive tube of the decomposition reactor tube.

3. The aftertreatment system of claim 1, wherein: the decomposition reactor tube comprises a decomposition reactor tube inlet configured to receive exhaust gas from an internal combustion engine;
   the decomposition reactor tube further comprises a decomposition reactor tube outlet configured to provide exhaust gas and reductant from the decomposition reactor tube;
   the first radiofrequency device is coupled to the decomposition reactor tube proximate the decomposition reactor tube inlet; and
   the second radiofrequency device is coupled to the decomposition reactor tube proximate the decomposition reactor tube outlet.

4. The aftertreatment system of claim 3, further comprising a diesel particulate filter positioned upstream of the decomposition reactor tube and configured to receive the exhaust gas from the internal combustion engine.

5. The aftertreatment system of claim 4, further comprising a selective catalytic reduction catalyst positioned downstream of the decomposition reactor tube.

6. The aftertreatment system of claim 5, wherein:
   the decomposition reactor tube comprises a decomposition reactor tube inlet configured to receive exhaust gas from an internal combustion engine; and
   the diesel particulate filter positioned is configured to provide the exhaust gas to the decomposition reactor tube inlet.

7. The aftertreatment system of claim 6, wherein:
   the decomposition reactor tube further comprises a decomposition reactor tube outlet configured to provide exhaust gas and reductant from the decomposition reactor tube; and
   the selective catalytic reduction catalyst is configured to receive the exhaust gas and reductant from the decomposition reactor tube outlet.

8. The aftertreatment system of claim 7, further comprising a diesel oxidation catalyst positioned upstream of the diesel particulate filter and configured to receive the exhaust gas from the internal combustion engine and provide the exhaust gas to the diesel particulate filter.

9. The aftertreatment system of claim 8, further comprising an ammonia slip catalyst positioned downstream of the selective catalytic reduction catalyst and configured to receive the exhaust gas from the selective catalytic reduction catalyst.

10. The aftertreatment system of claim 1, wherein:
    the decomposition reactor tube comprises a decomposition reactor tube inlet configured to receive exhaust gas from an internal combustion engine;
    the decomposition reactor tube further comprises a decomposition reactor tube outlet configured to provide exhaust gas and reductant from the decomposition reactor tube;
    the first radiofrequency device is coupled to the decomposition reactor tube proximate the decomposition reactor tube outlet; and
    the second radiofrequency device is coupled to the decomposition reactor tube proximate the decomposition reactor tube inlet.

11. The aftertreatment system of claim 1, wherein the doser is coupled to the decomposition reactor tube between the first radiofrequency communicator and the second radiofrequency communicator.

12. The aftertreatment system of claim 1, wherein the controller is configured to compare the amount of reductant deposits within the decomposition reactor tube to a deposit formation threshold.

13. The aftertreatment system of claim 12, wherein the controller is configured to, in response to determining that the amount of reductant deposits is greater than the deposit formation threshold, activate a deposit mitigation process.

14. The aftertreatment system of claim 1, wherein the first radiofrequency device is identical to the second radiofrequency device.

15. The aftertreatment system of claim 1, wherein:
    the first radiofrequency communicator is a transceiver; and
    the second radiofrequency communicator is a transceiver.

16. The aftertreatment system of claim 1, wherein the decomposition reactor tube substantially blocks transmission of electromagnetic signals from outside of the decomposition reactor tube traveling through the decomposition reactor tube and into the decomposition reactor tube.

* * * * *